US008401298B2

(12) United States Patent
Suwa

(10) Patent No.: US 8,401,298 B2
(45) Date of Patent: Mar. 19, 2013

(54) STORAGE MEDIUM STORING CHARACTER RECOGNITION PROGRAM, CHARACTER RECOGNITION METHOD, AND CHARACTER RECOGNITION APPARATUS

(75) Inventor: Misako Suwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 442 days.

(21) Appl. No.: 12/695,351

(22) Filed: Jan. 28, 2010

(65) Prior Publication Data

US 2010/0215276 A1 Aug. 26, 2010

(30) Foreign Application Priority Data

Feb. 25, 2009 (JP) .................................. 2009-42278

(51) Int. Cl.
*G06K 9/18* (2006.01)
(52) U.S. Cl. .................... 382/182; 382/209; 382/218
(58) Field of Classification Search .................. 382/181, 382/182, 186, 187, 209, 218
See application file for complete search history.

(56) References Cited

U.S. PATENT DOCUMENTS

| | | | | |
|---|---|---|---|---|
| 5,131,053 A | * | 7/1992 | Bernzott et al. | 382/176 |
| 6,057,845 A | * | 5/2000 | Dupouy | 715/863 |
| 6,104,833 A | * | 8/2000 | Naoi et al. | 382/190 |
| 6,111,976 A | * | 8/2000 | Rylander | 382/114 |
| 6,850,645 B2 | * | 2/2005 | Naoi et al. | 382/190 |
| 6,970,601 B1 | * | 11/2005 | Kaneda et al. | 382/209 |
| 2001/0026639 A1 | | 10/2001 | Sparr et al. | |
| 2002/0061135 A1 | * | 5/2002 | Naoi et al. | 382/190 |
| 2003/0113016 A1 | * | 6/2003 | Naoi et al. | 382/181 |

FOREIGN PATENT DOCUMENTS

| | | |
|---|---|---|
| CN | 1315024 A | 9/2001 |
| JP | 03-037782 | 2/1991 |
| JP | 8-16720 | 1/1996 |

OTHER PUBLICATIONS

Filatov, Alexander, et al. "Graph-based Handwritten Digit String Recognition", Third International Conference on Document Analysis and Recognition (ICDAR' 95)—vol. 2, Aug. 14, 1995, pp. 845-848.

Ullmann, J. R., "An Algorithm for Subgraph Isomorphism", Journal of the Association for Computing Machinery, vol. 23, No. 1, Jan. 1976, pp. 31-42.

Office Action issued by the State Intellectual Property Office of People's Republic of China on Aug. 22, 2012 in the corresponding Chinese patent application.

Office Action issued by the State Intellectual Property Office of People's Republic of China on Mar. 31, 2012 in the corresponding Chinese patent application.

* cited by examiner

*Primary Examiner* — John Strege
(74) *Attorney, Agent, or Firm* — Staas & Halsey LLP

(57) ABSTRACT

A storage medium storing a character recognition program for causing a computer to execute a process, the process including comparing a structure of a target pattern regarded as one character with a structure of a one-character pattern stored in a storage section and determining whether the target pattern is a pattern including a plurality of characters, on the basis of a result of the comparing.

15 Claims, 12 Drawing Sheets

FIG. 4

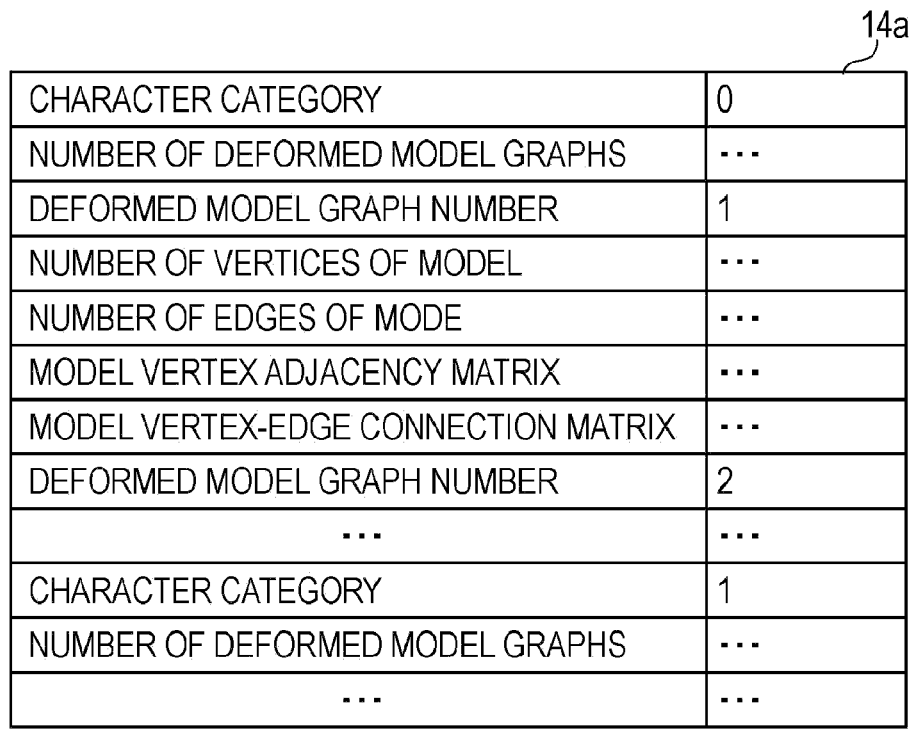

| CHARACTER CATEGORY | 0 |
| --- | --- |
| NUMBER OF DEFORMED MODEL GRAPHS | ... |
| DEFORMED MODEL GRAPH NUMBER | 1 |
| NUMBER OF VERTICES OF MODEL | ... |
| NUMBER OF EDGES OF MODE | ... |
| MODEL VERTEX ADJACENCY MATRIX | ... |
| MODEL VERTEX-EDGE CONNECTION MATRIX | ... |
| DEFORMED MODEL GRAPH NUMBER | 2 |
| ... | ... |
| CHARACTER CATEGORY | 1 |
| NUMBER OF DEFORMED MODEL GRAPHS | ... |
| ... | ... |

FIG. 5

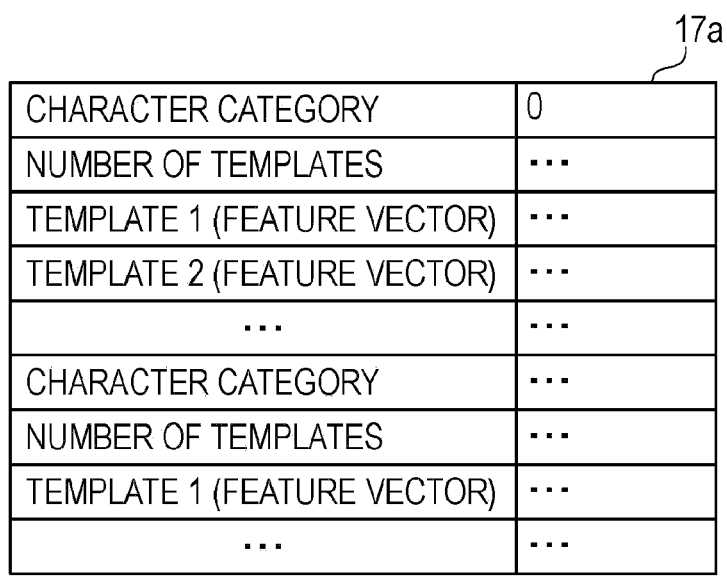

| CHARACTER CATEGORY | 0 |
| --- | --- |
| NUMBER OF TEMPLATES | ... |
| TEMPLATE 1 (FEATURE VECTOR) | ... |
| TEMPLATE 2 (FEATURE VECTOR) | ... |
| ... | ... |
| CHARACTER CATEGORY | ... |
| NUMBER OF TEMPLATES | ... |
| TEMPLATE 1 (FEATURE VECTOR) | ... |
| ... | ... |

| EDGE LABEL | e1 | e2 | e3 | e4 | e5 | e6 | e7 |
|---|---|---|---|---|---|---|---|
| LENGTH | 22 | 10 | 12 | 10 | 7 | 13 | 7 |

FIG. 14

| MATCHING NUMBER (k) | 1 | 2 | 3 | 4 |
|---|---|---|---|---|
| SUM OF LENGTHS OF MATCHED EDGES ($l_{1k}$) | 54 | 54 | 39 | 39 |
| MATCHING DEGREE ($m_{61k}$) | 0.67 | 0.67 | 0.48 | 0.48 |

FIG. 15

| MATCHING NUMBER (k) | 1 | 2 | 3 | 4 | 5 | 6 | 7 |
|---|---|---|---|---|---|---|---|
| SUM OF LENGTHS OF MATCHED EDGES ($l_{2k}$) | 22 | 10 | 12 | 10 | 7 | 13 | 7 |
| MATCHING DEGREE ($m_{62k}$) | 0.27 | 0.12 | 0.15 | 0.12 | 0.09 | 0.16 | 0.09 |

STORAGE MEDIUM STORING CHARACTER RECOGNITION PROGRAM, CHARACTER RECOGNITION METHOD, AND CHARACTER RECOGNITION APPARATUS

CROSS-REFERENCE TO RELATED APPLICATIONS

This application is based upon and claims the benefit of priority of the prior Japanese Patent Application No. 2009-42278, filed on Feb. 25, 2009, the entire contents of which are incorporated herein by reference.

FIELD

Various embodiments described herein relate to a storage medium storing a character recognition program, a character recognition method, and a character recognition apparatus.

BACKGROUND

There have been known OCR (optical character reader) functions that optically read hand-written or printed characters and compare the read characters with previously stored patterns so as to identify the read characters.

Character strings to be read may include touching characters that are touching another character and isolated characters that are each one character.

Typical OCR functions include a function that determines whether a pattern is a touching pattern candidate, which may be touching another character, or an isolated character pattern candidate, which is highly likely to be one character, in order to increase recognition efficiency or avoid an extraction error due to an increase in the number of character extraction candidates.

If it is determined that the pattern is an isolated character pattern candidate, the pattern is directly subjected to one-character recognition.

On the other hand, if it is determined that the pattern is a touching pattern candidate, the pattern is subjected to segmentation (extraction and recognition).

Among known methods for determining whether a pattern is touching pattern candidate are a method of determining that a target pattern, whose length in the character string direction is equal to or larger than a threshold, is a touching pattern candidate and a method of determining that a target pattern, where W/H>K where W is the width of the pattern, H is the height thereof, and K is a constant, is a touching pattern candidate.

The above-mentioned methods use the nature of a touching pattern whose length in the character string direction is generally larger than that of an isolated character pattern.

However, there are cases where although a pattern is a touching pattern the pattern cannot be distinguished from an isolated touching pattern on the basis of the length in the character string direction or the width-to-height ratio (W/H). In such a case, it is not determined that the pattern is a touching pattern candidate, causing erroneous character recognition.

If the threshold is lowered to avoid such an erroneous determination, the probability with which it is determined that a pattern is a touching pattern candidate is increased somewhat. However, the number of touching pattern candidates is increased accordingly. Thus, the number of characters to be extracted is increased so that an erroneous segmentation result may be selected.

SUMMARY

A storage medium storing a character recognition program for causing a computer to execute a process, the process including comparing a structure of a target pattern regarded as one character with a structure of a one-character pattern stored in a storage section and determining whether the target pattern is a pattern including a plurality of characters, on the basis of a result of the comparing.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

BRIEF DESCRIPTION OF DRAWINGS

FIG. 4 is a drawing showing a data configuration of a character recognition dictionary;

FIG. 5 is a drawing showing a data configuration of a deformed model graph;

FIG. 14 is a drawing showing the matching degrees of a deformed model graph; and FIG. 15 is a drawing showing the matching degrees of a deformed model graph.

DESCRIPTION OF EMBODIMENTS

Hereafter, various embodiments of the present invention will be described in detail with reference to the accompanying drawings.

First, a character recognition apparatus according to an embodiment will be described and then this embodiment will be described more specifically.

Figure 1:
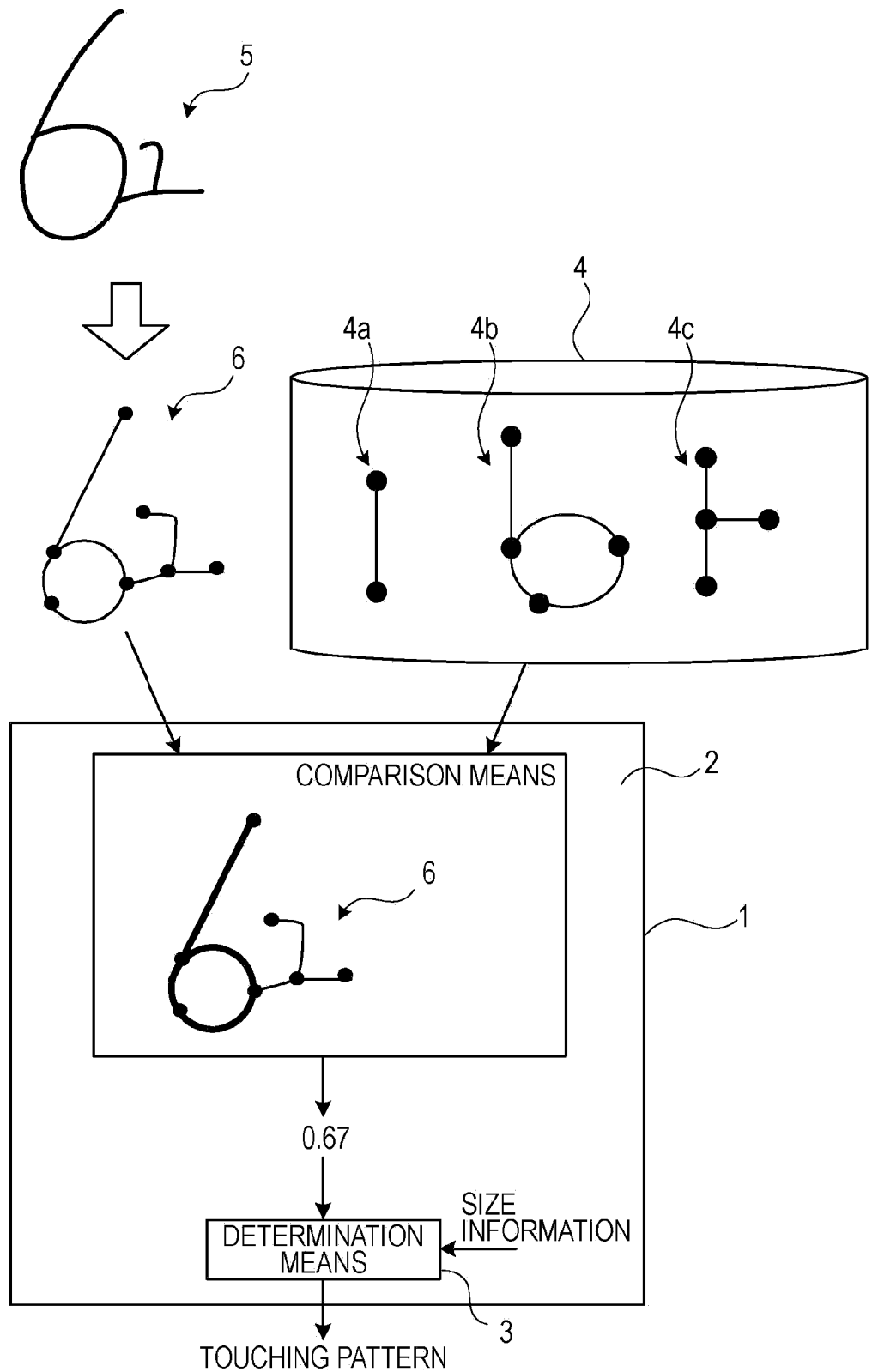
FIG. 1 is a drawing schematically showing a character recognition apparatus according to an embodiment of the present invention.

FIG. 1 is a drawing schematically showing the character recognition apparatus according to this embodiment.

A character recognition apparatus (computer) 1 functions as comparison means 2 and determination means 3. The comparison means 2 compares the structure of a pattern regarded as one character, with one-character pattern structures stored in a storage section 4. The one-character pattern structures are previously prepared, and if a target pattern is one character, the one-character pattern structures are used to recognize the target character. The storage section 4 may be provided in the character recognition apparatus 1 or provided outside the apparatus.

For example, FIG. 1 shows a target pattern 5 that is freely written in a non-frame area, where no one-character frame is printed and where a hard-written "2" is touching a hand-written number "6." The target pattern 5 is a pattern that is regarded as one character although the pattern is a pattern where the number "2" is touching the number "6."

The target pattern 5 is shaped in accordance with a rule to be described later and serves as a structure 6 having vertices and edges.

In FIG. 1, the storage section 4 stores three one-character pattern structures 4a, 4b, and 4c for recognizing a number as "6."

The comparison means 2 compares the structure 6 with the one-character pattern structures 4a, 4b, and 4c. For example, the comparison means 2 determines whether the structure 6 has a portion having the same shape as that of a portion of each of the structures 4a, 4b, and 4c.

In FIG. 1, the comparison means 2 is determining whether the structure 6 has a portion having the same shape of that of a portion of the structure 4b. Then, the comparison means 2 calculates the degree to which the structure 4b matches the structure 6, as the similarity degree.

On the basis of the result of the comparison made by the comparison means 2, the determination means 3 determines whether the target pattern is one character.

In FIG. 1, the determination means 3 determines whether the target pattern 5 is one character, using a similarity degree "0.67," which the result of the comparison made by the comparison means 2, as well as size information (the ratio of the width of the pattern to the height thereof). For example, if the similarity degree "0.67" is equal to or higher than a predetermined threshold and if the above-mentioned ratio is equal to or higher than a predetermined threshold, the determination means 3 determines that the target pattern 5 is one character. If not so, the determination means 3 determines that the target pattern 5 is a touching pattern.

In FIG. 1, it is determined that the target pattern 5 is a touching pattern.

As seen, the character recognition apparatus 1 can accurately determine whether a character is a touching pattern by comparing structures.

Hereafter, the embodiment will be described more specifically.

Figure 2:
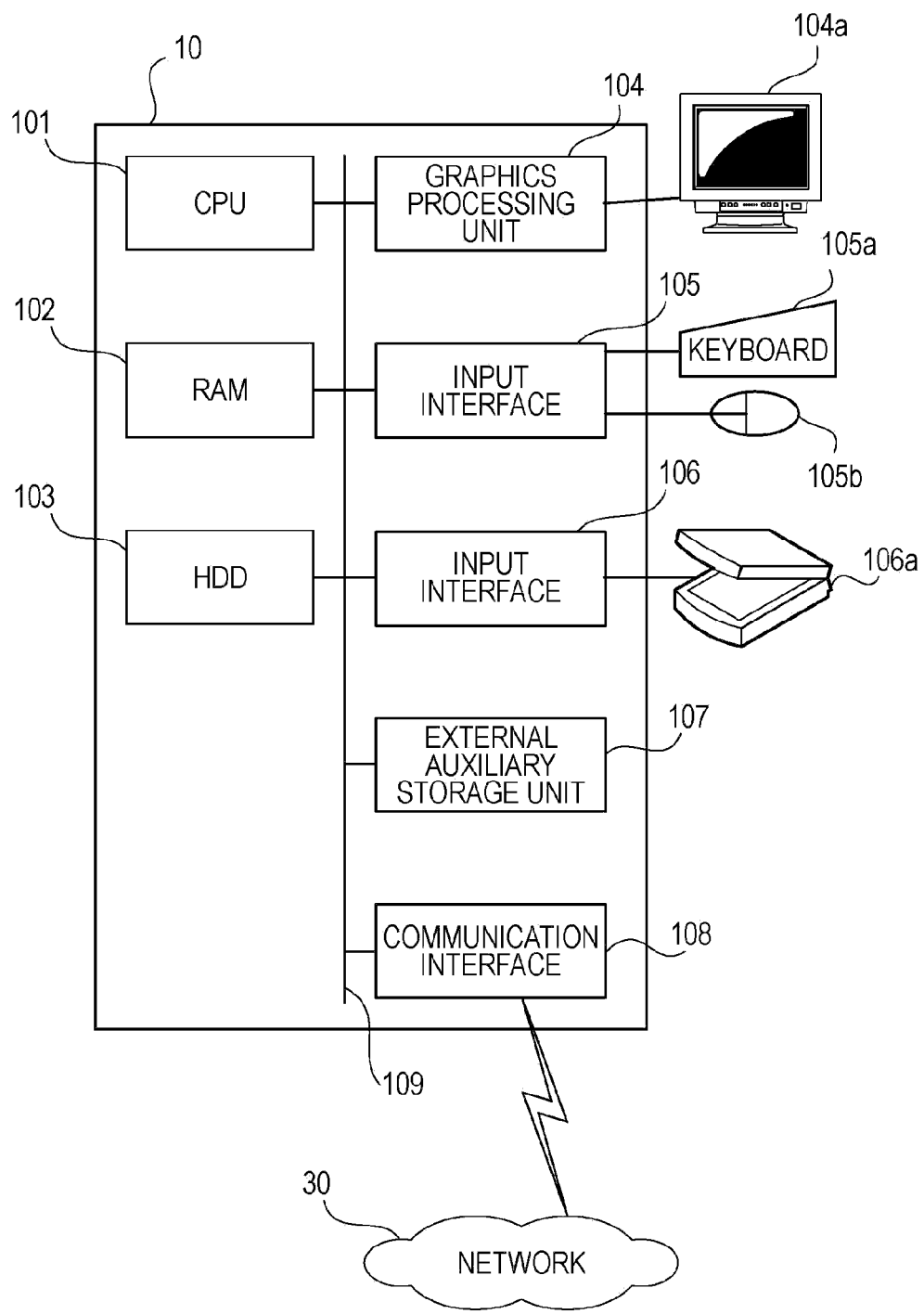
FIG. 2 is drawing showing an example hardware configuration of the character recognition apparatus.

FIG. 2 is a drawing showing an example hardware configuration of the character recognition apparatus.

The entire character recognition apparatus 10 is controlled by a CPU (central processing unit) 101. Connected to the CPU 101 via a bus 109 are a RAM (random access memory) 102, a hard disk drive (HDD) 103, a graphics processing unit 104, an input interfaces 105 and 106, an external auxiliary storage unit 107, and a communication interface 108.

The RAM 102 temporarily stores at least some of programs of an OS (operating system) and application programs to be executed by the CPU 101. Also, the RAM 102 stores various types of data required for processing performed by the CPU 101. The HDD 103 stores the OS and application programs. Also, the HDD 103 stores programs files.

Connected to the graphics processing unit 104 is a monitor 104a. The graphics processing unit 104 displays images on the screen of the monitor 104a in accordance with a command issued by the CPU 101. Connected to the control section 105 are a keyboard 105a and a mouse 105b. The input interface 105 sends a signal sent from the keyboard 105a or mouse 105b, to the CPU 101 via the bus 109.

The input interface 106 is connected to an image scanner 106a. The input interface 106 sends a signal (e.g., an image signal obtained by converting a form image into electronic data) sent from the image scanner 106a, to the CPU 101 via the bus 109.

The external auxiliary storage unit 107 reads information written into a storage medium or writes information into a storage medium. Examples of a storage medium readable or writable by the external auxiliary storage unit 107 include magnetic storage units, optical disks, magneto-optical storage media, and semiconductor memories. Examples of magnetic storage units include HDDs, flexible disks (FDs), and magnetic tapes. Examples of optical disks include DVDs (digital versatile discs), DVD-RAMs, CD-ROMs (compact disc read only memories), CD-Rs (recordable)/CD-RWs (rewritable). Examples of magneto-optical storage media include MOs (magneto-optical disks).

The communication interface 108 is connected to a network 30. The communication interface 108 sends or receives data to or from other computers via the network 30.

The above-mentioned hardware configuration can realize the processing functions according to this embodiment. The character recognition apparatus 10 having the above-mentioned hardware configuration has the following functions.

Figure 3:
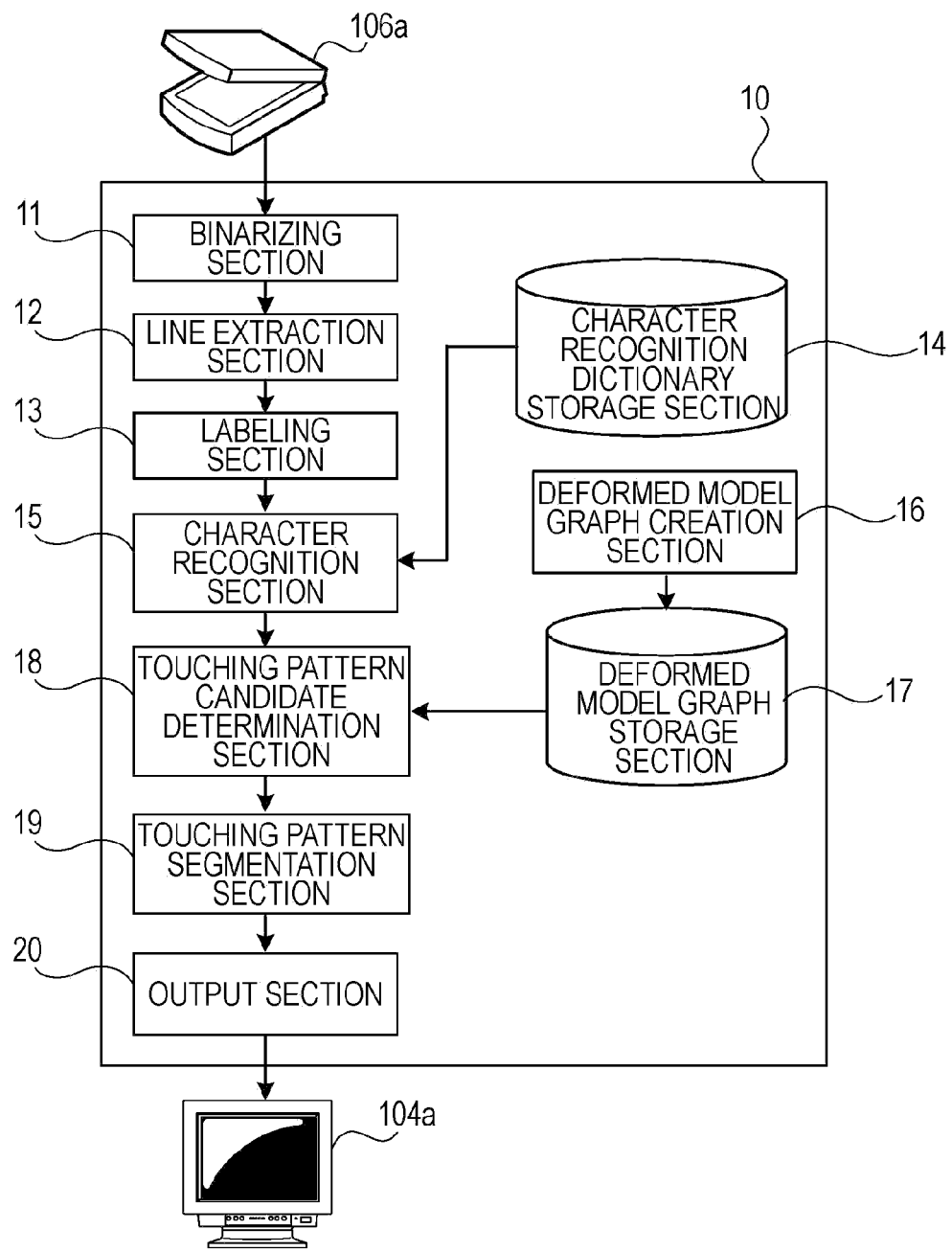
FIG. 3 is a function block diagram showing the functions of the character recognition apparatus.

FIG. 3 is a function block diagram showing the functions of the character recognition apparatus.

The character recognition apparatus 10 includes a binarizing section 11, a line extraction section 12, a labeling section 13, a character recognition dictionary storage section 14, a character recognition section 15, a deformed model graph creation section 16, a deformed model graph storage section 17, a touching pattern candidate determination section 18, a touching pattern segmentation section 19, and an output section 20.

The binarizing section 11 binarizes an image obtained when the image scanner 106a converts a form image into electronic data.

The line extraction section 12 extracts a line of characters (character line) from the form image binarized by the binarizing section 11. Hereafter, a character pattern included in the extracted character line will be referred to as a "target pattern."

The labeling section 13 labels (numbers) different connected components of the target pattern. At that time, if necessary, the labeling section 13 examines the overlap between the circumscribed rectangles of the connected components to combine the labels.

The character recognition dictionary storage section 14 stores a dictionary used for character recognition.

The character recognition section 15 reads the character recognition dictionary stored in the character recognition dictionary storage section 14 to perform character recognition on a target pattern corresponding to each label.

The deformed model graph creation section 16 creates a deformed model graph for each of the character categories used to determine whether the target pattern is a touching pattern candidate and stores the created deformed model graphs in the deformed model graph storage section 17. A deformed model graph and a creation method thereof will be described in detail later.

On the basis of the result of the character recognition performed by the character recognition section 15 on the target pattern, the touching pattern candidate determination section 18 determines whether the target pattern is a touching pattern candidate, using the deformed model graphs stored in the deformed model graph storage section 17.

If it is determined that the target pattern is a touching pattern candidate, the touching pattern segmentation section 19 detects a touching portion in the target pattern and extracts it to obtain a recognition result of the target pattern.

The output section 20 outputs the character recognition result of the target pattern, to the monitor 104a.

Next, a data configuration of the character recognition dictionary stored in the character recognition dictionary storage section 14 will be described.

FIG. 4 is a drawing showing a data configuration of the character recognition dictionary.

In this embodiment, an example where data is stored as listed in a table is shown.

In a data table 14a, the number of deformed model graphs is set for each character category. Also, each deformed model graph is assigned a number for identifying the deformed model graph. The number of model vertices, the number of model edges, the model vertex adjacency matrix, and the model vertex-edge connection matrix are set for each deformed model graph.

The model vertex adjacency matrix refers to a matrix indicating the inter-vertex adjacency relation using "1" and "2." For example, when the number of vertices is "n," the model vertex adjacency matrix is a matrix with n rows and n columns.

The model vertex-edge connection matrix refers to a matrix indicating the vertex-edge connection relation using "0" and "1." For example, when the number of vertices is "n" and the number of edges is "m," the model vertex-edge connection matrix is a matrix with n rows and m columns.

Next, a data configuration of the deformed model graphs stored in the deformed model graph storage section 17 will be described.

FIG. 5 is a drawing showing a data configuration of a deformed model graph.

In this embodiment, in a data table 17a, the number of templates (dictionaries) is set for each character category. Also, information for identifying components of a vector is set for each template.

Next, a configuration of the deformed model graph creation section 16 will be described in detail.

Figure 6:
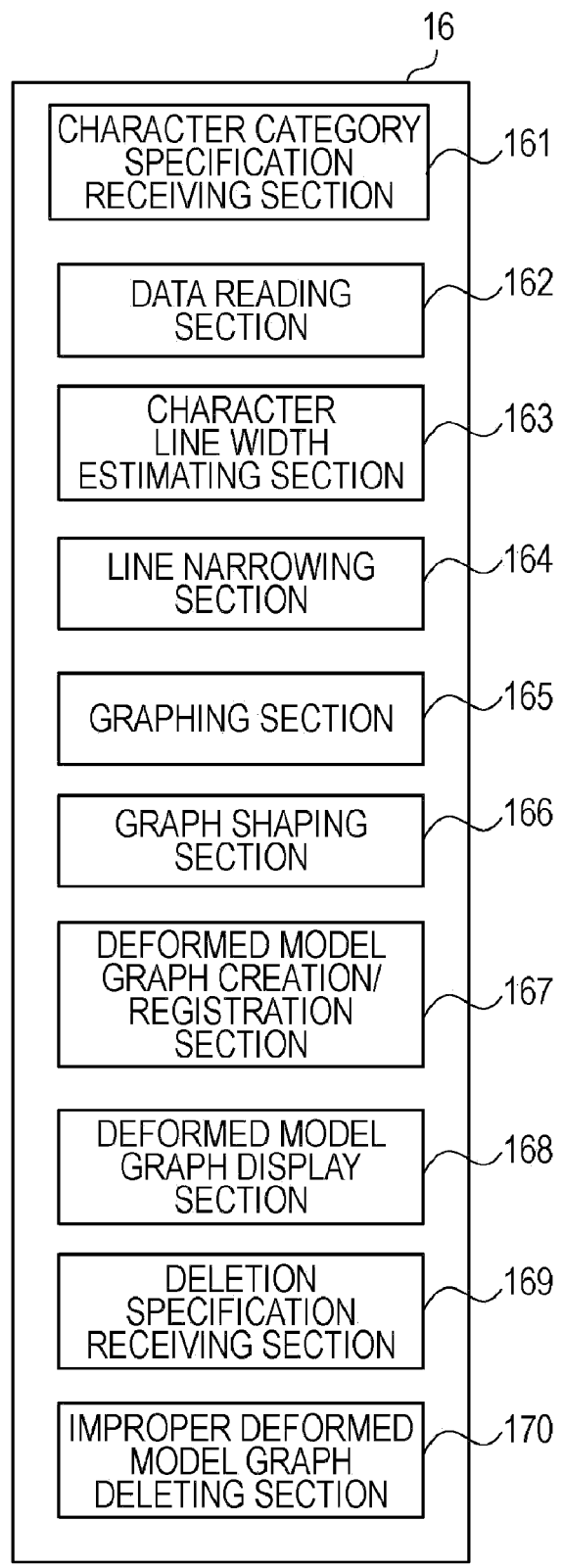
FIG. 6 is a drawing showing a configuration of a deformed model graph creation section.

FIG. 6 is a drawing showing a configuration of the deformed model graph creation section.

The deformed model graph creation section 16 includes a character category specification receiving section 161, a data reading section 162, a character line width estimating section 163, a line narrowing section 164, a graphing section 165, a graph shaping section 166, a deformed model graph creation/registration section 167, a deformed model graph display section 168, a deletion specification receiving section 169, and an improper deformed model graph deleting section 170.

The character category specification receiving section 161 receives specification (input) of a character category, with respect to which a user desires to create a deformed model graph, made by the user.

The data reading section 162 reads binary one-character image data for learning of the character category received by the character category specification receiving section 161, for example, from a database prepared in advance. Hereafter, a character pattern included in one-character image data will be referred to as a "one-character pattern."

The character line width estimating section 163 estimates the width of the character line of the one-character pattern.

The line narrowing section 164 narrows the line of the one-character pattern.

The graphing section 165 extracts the vertices and the edges between the vertices from the one-character pattern whose line has been narrowed by the line narrowing section 164. Then, the connection relations and adjacency relations between the extracted edges and vertices are obtained so that the one-character pattern is graphed.

The graph shaping section 166 shapes the graph drawn by the graphing section 165 in accordance with a predetermined rule in order to prevent an increase in the number of deformed model graphs of each character category and a resulting increase in the frequency at which matching is performed.

The deformed model graph creation/registration section 167 registers a graph of the first one-character pattern as a deformed model graph unconditionally. As for the second and later one-character pattern graphs, the deformed model graph creation/registration section 167 matches those graphs with each of the registered deformed model graphs. If any pattern graph does not meet the matching conditions, the deformed model graph creation/registration section 167 determines that the pattern graph is a different deformation and registers it as a new deformed model graph. This process will be described in detail later.

The deformed model graph display section 168 displays all deformed model graphs registered as deformed model graphs of the specified character category and displays check boxes for deletion near the deformed model graphs.

The deletion specification receiving section 169 receives deletion information specified on the basis of checks made by the user on the check boxes using the mouse 105b or the like.

On the basis of the deletion information received by the deletion specification receiving section 169, the improper deformed model graph deleting section 170 deletes data corresponding to the deformed model graphs whose deletion has been specified, from the registered deformed model graph data. Also, the improper deformed model graph deleting section 170 modifies the model numbers of the remaining deformed model graphs.

Next, the process performed by the deformed model graph creation section 16 will be described in detail.

<Graphing Section>

The graphing section 165 represents the narrowed one-character pattern obtained by the line narrowing section 164, using a graph. Specifically, first, vertex coordinates and a degree are obtained from the narrowed one-character pattern. Next, the edges between vertices are tracked to obtain the coordinates of points on the edges, the lengths of the edges, and the numbers of the vertices connected to the edges. Also, the numbers of the edges connected to the vertices are obtained.

Using the information about the edges and vertices, a vertex adjacency matrix is calculated. The adjacency matrix is a matrix represented by the number of vertices× the number of vertices. If a vertex and a vertex are linked by an edge, the vertices have a value of "1." If not so, the vertices have a value of "0." These are equal to the general definitions of the graph theory.

Specifically, the graphing section 165 calculates the following data and stores the obtained pieces of data in structures prepared for the pieces of data.

(1) Graph Information

The numbers of edges and vertices forming a graph, a vertex adjacency matrix, and an edge-vertex connection matrix are calculated and stored in a graph information structure.

(2) Edge Information

The length of each edge, the numbers of two vertices connected to each edge, and the coordinates of the track of each edge are calculated and stored in an edge information structure.

(3) Vertex Information

The coordinates and degree of each vertex and the numbers of edges connected to each vertex are calculated and stored in a vertex information structure.

This structure may be structured, for example, as follows.

<Edge Information Structure>

```
struct Edge_inf{
    short *vertexNo;   matrix of the numbers of connected vertices
    short *xcood;      x coordinate matrix pointer to points (track)
                       on an edge
    short *ycood;      y coordinate matrix pointer to points (track)
                       on an edge
    short length;      the length of an edge
    short vn1, vn2;    the numbers of two vertices connected to an edge
};
```

<Vertex Information Structure>

```
Struct Vertex_inf{
    short x, y;        x, y coordinates of a vertex
    short degree;      the degree of a vertex
    short *edgeNo;     matrix pointer to the number of a connected edge
    short counter;     a counter used when tracking an edge};
```

<Graph Information Structure>

```
struct Graph_inf{
    struct Edge_inf  *edge;      edge information structure pointer
    short            edgeNo;     the number of edges
    struct Vertex_inf *vertex;   vertex information structure pointer
    short            vertexNo;   the number of vertices
    short            *smatrix;   connection matrix pointer
    short            *bmatrix;   adjacency matrix pointer};
```

<Graph Shaping Section>

The graph shaping section 166 shapes the graph obtained from the one-character pattern.

The graph is shaped with reference to the graph deformation technique described in Filatov, Gitis, and Kil, "Graph-based Handwritten Digit String Recognition," Third International Conference on Document Analysis and Recognition (ICDAR'95), Volume 2, pp. 845-848, section 5.1. The graph deformation technique according to this embodiment differs from that described in the above-mentioned document in that a vertex having a degree of 2 is added to the loop of the graph.

The rule for shaping is as follows.

FIGS. 7A to 7E are drawings showing shaping of a graph. The graph shaping section 166 performs deletion, division, and addition on a structure having the edges and vertices obtained by the graphing section 165 so as to re-calculate an adjacency matrix and a connection matrix.

Figure 7E:
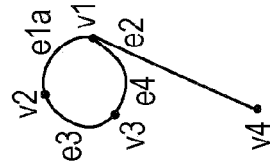
FIG. 7E is a drawing showing shaping of a graph.
Figure 7D:
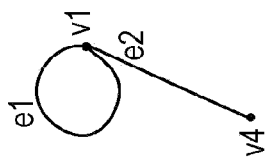
FIG. 7D is a drawing showing shaping of a graph.
Figure 7C:
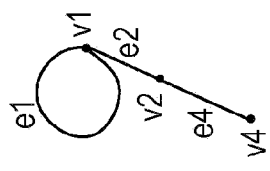
FIG. 7C is a drawing showing shaping of a graph.
Figure 7B:
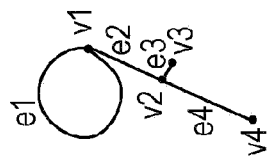
FIG. 7B is a drawing showing shaping of a graph.
Figure 7A:
FIG. 7A is a drawing showing shaping of a graph.

Specifically, as shown in FIG. 7A, as a result of the treatment performed by the line narrowing section 164, recesses and protrusions on the character line may make protrusions on the one-character pattern graph. These protrusions must be eliminated.

Specifically, all edges that have a certain length or shorter and are connected to a vertex (endpoint) having a degree of "1" are deleted from the one-character pattern graph. In this case, the protrusions are eliminated until the character line width is reduced to a previously calculated one or so.

In an example shown in FIG. 7B, an edge e3 becomes the subject of deletion. The edge 3e is connected to a vertex v2 having a degree of "3" and a vertex v3 having a degree of "1."

In this case, the vertex v3 having a degree of "1" is deleted. Subsequently, "1" is subtracted from the degree of the other vertex. That is, as shown in FIG. 7C, the edge information structure corresponding to the edge e3 is deleted and the degree of the member of the vertex information structure corresponding to the vertex v2 is reduced from "3" to "2." Also, the number of the deleted edge is eliminated from the matrix of the numbers of the connected edges. This is because the number of the connected edges is reduced.

Next, all vertices whose degree has become "2" in the above-mentioned process are eliminated.

In an example shown in FIG. 7D, the vertex v2 is eliminated and an edge e4 is integrated into an edge e2. That is, the vertex information structure corresponding to the vertex v2 is deleted and the edge information structures of the edges e2 and e4 are combined.

Next, two arbitrary vertices having a degree of "2" are added to arbitrary positions on the loop so that one edge is necessarily connected to two vertices. Accordingly, the edge of the loop is divided into three edges.

In an example shown in FIG. 7E, the vertices v2 and v3 having a degree of "2" are added to the loop, and an edge e1 is divided into an edge e1a, the edge e3, and the edge e4. That is, vertex information structures corresponding to the vertices v2 and v3 are created and the position coordinates thereof are defined as arbitrary two points among points on the edge of the edge information structure of the edge e1. Thus, the edge information structure corresponding to the edge e1 is divided into three edge information structures corresponding to the edges e1a, e3, and e4.

Finally, an adjacency matrix and a connection matrix are re-calculated from the obtained edge information structures and vertex information structures.

Next, the process performed by the deformed model graph creation/registration section 167 will be described in detail.

<Deformed Model Graph Creation/Registration Section>

The deformed model graph creation/registration section 167 registers the first shaped pattern graph as a deformed model graph of the target character category unconditionally and sets the number of deformed model graphs corresponding to the character category to "1."

As for the second and later pattern graphs, the same process as that performed on the first pattern graph is performed until the shaping of the graph is completed. However, the deformed model graph creation/registration section 167 determines whether the second and later pattern graphs are isomorphic to the registered deformed model graphs. If any pattern graph is not isomorphic, the deformed model graph creation/registration section 167 registers the pattern graph as a new deformed model graph and increases the number of deformed model graphs by "1." "Isomorphic" means that a pattern graph completely matches any one of the deformed model graphs.

<Deformed Model Graph Display Section>

Figure 8:
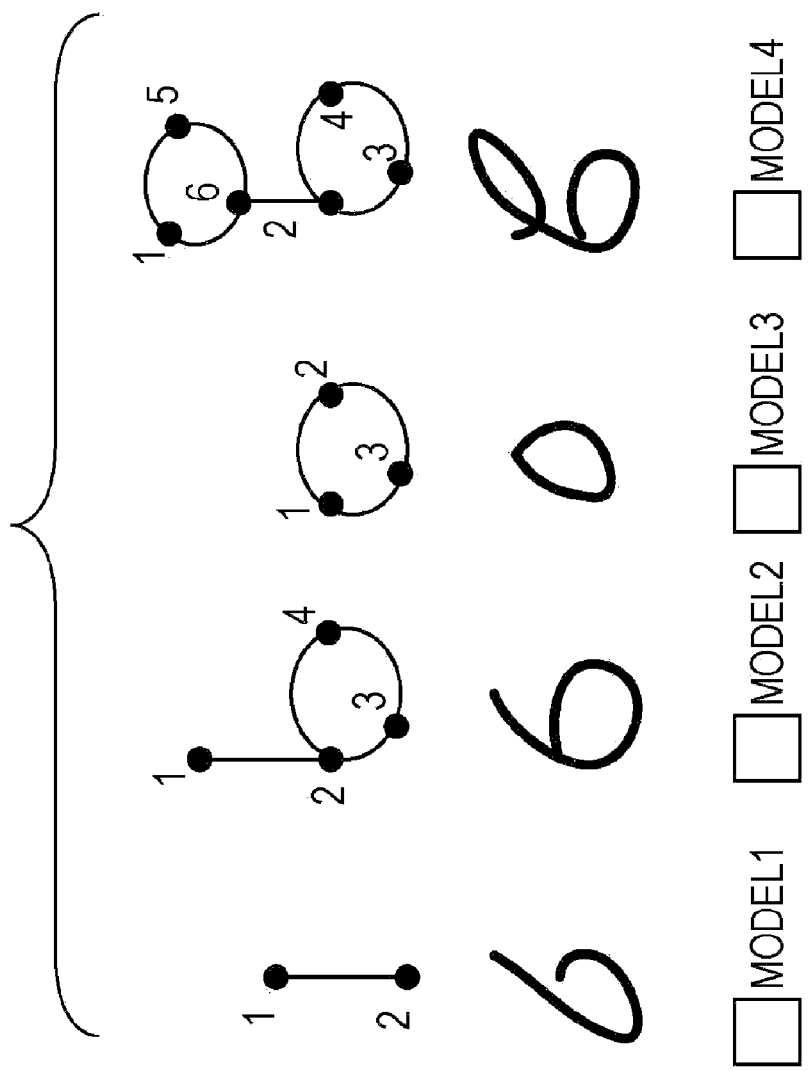
FIG. 8 is a drawing showing a process performed by a deformed model graph display section.

FIG. 8 is a drawing showing the process performed by the deformed model graph display section.

After the above-mentioned process is performed on all the creation target patterns and deformed model graphs are created and registered, the deformed model graph display section 168, as shown in FIG. 8, displays all the deformed model graphs registered as deformed model graphs of the specified character category ("6" in FIG. 8) and check boxes for deletion.

This is because, in cases such as one where a pattern having noise such as stains is mixed with the creation target patterns for learning or one where a pattern of another character category is mixed erroneously, an improper deformed model graph is created and therefore must be eliminated.

As described above, when the deletion specification receiving section 169 receives a check made by the user on the deletion check box of an improper deformed model graph using the mouse 105*b* or the like, it specifies the deformed model graph as the subject of deletion.

The improper deformed model graph deleting section 170 deletes data corresponding to the deformed model graph specified as the subject of deletion from the deformed model graphs registered in the deformed model graph creation/registration section 167. Simultaneously, the improper deformed model graph deleting section 170 modifies the model numbers of the remaining deformed model graphs.

FIG. 8 shows four deformed model graphs created by the deformed model graph creation/registration section 167 with respect to the character category "6."

The third deformed model graph from the left in FIG. 8 is a one-character image of a different character category that has been mixed erroneously. The fourth deformed model graph from the left is a deformed model graph that has been created from a pattern having noise thereon.

If checks made by the user on the check boxes of the third and fourth deformed model graphs are received, corresponding deformed model graphs are deleted from the deformed model graphs registered by the deformed model graph creation/registration section 167. As a result, the first and second deformed model graphs are regarded as deformed model graphs corresponding to the character category "6." Note that the one-character pattern structures 4*a*, 4*b*, and 4*c* shown in FIG. 1 correspond to deformed model graphs that are left after the deletion.

Next, a configuration of the touching pattern candidate determination section 18 will be described.

Figure 9:
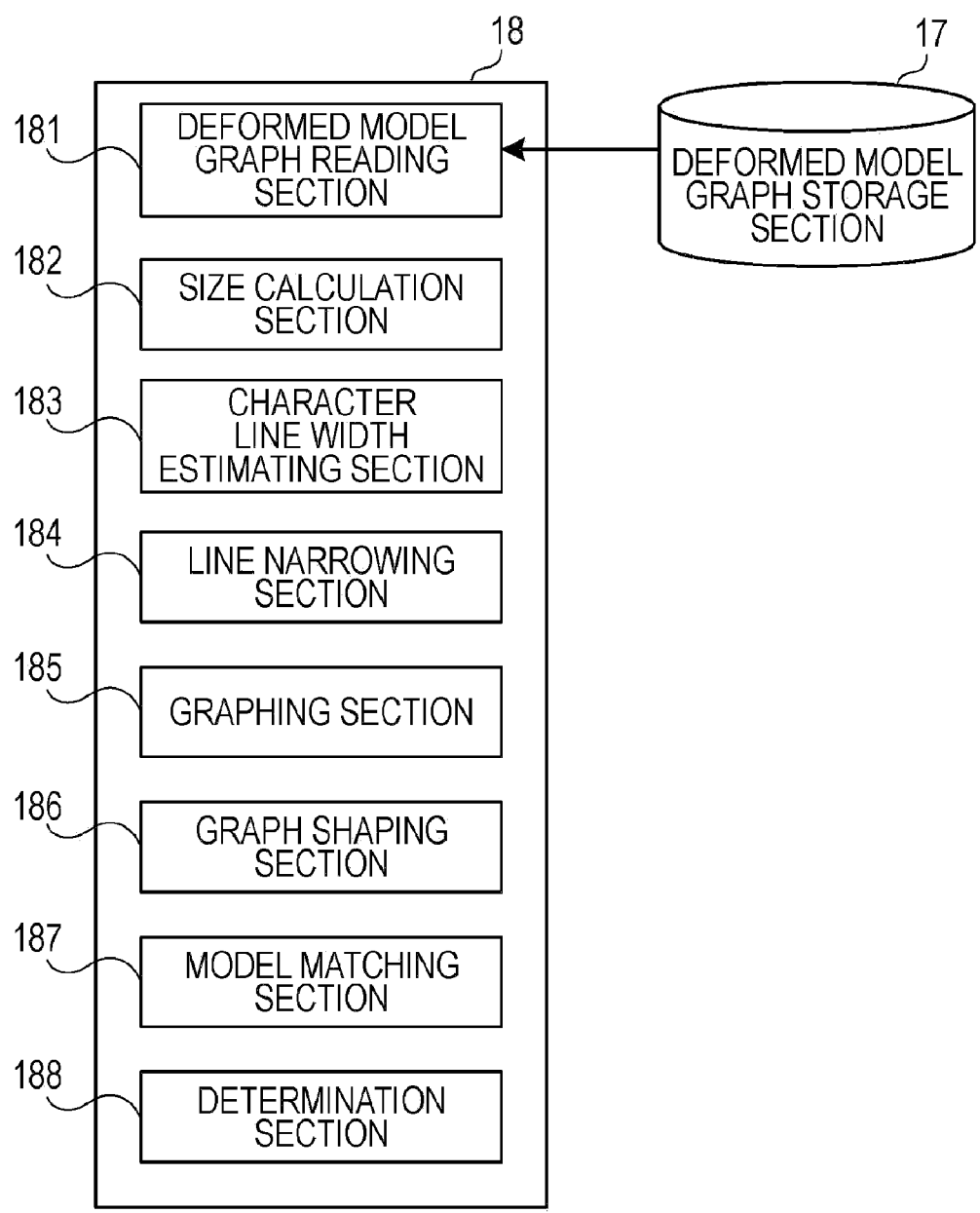
FIG. 9 is a drawing showing a configuration of a touching pattern candidate determination section.

FIG. 9 is a drawing showing a configuration of the touching pattern candidate determination section.

The touching pattern candidate determination section 18 includes a deformed model graph reading section 181, a size calculation section 182, a character line width estimating section 183, a line narrowing section 184, a graphing section 185, a graph shaping section 186, a model matching section 187, and a determination section 188.

The deformed model graph reading section 181 reads deformed model graphs corresponding to the first place character category (character category regarded as the most possible) in the character recognition result. For example, if the first place character category in the character recognition result is "6," the deformed model graph reading section 181 reads a deformed model graph of "6."

The size calculation section 182 obtains the width, the height, and the width-to-height ratio of the target pattern.

The character line width estimating section 183 estimates the width of the character line of the target pattern.

The line narrowing section 184, graphing section 185, and graph shaping section 186 have functions similar to those of the line narrowing section 164, graphing section 165, and graph shaping section 166.

Specifically, the line narrowing section 184 narrows the line of the target pattern.

The graphing section 185 extracts the vertices and the edges between the vertices from the narrowed pattern. Then, the graphing section 185 obtains the connection relations and adjacency relations between the extracted edges and vertices so as to draw a graph.

The graph shaping section 186 shapes the graph drawn by the graphing section 185 in accordance with a predetermined rule.

The model matching section 187 matches all deformed model graphs corresponding to the first place character category in the character recognition result, with the graph shaped by the graph shaping section 186. Specifically, the model matching section 187 calculates the similarity degree between the graph shaped by the graph shaping section 186 and each of the deformed model graphs and obtains the highest matching degree (highest similarity degree) from among the calculated similarity degrees.

On the basis of the matching degree of the deformed model graph calculated by the model matching section 187 and the width-to-height ratio of the target pattern calculated by the size calculation section 182, the determination section 188 determines whether the target pattern is a touching pattern candidate.

Next, the process (touching pattern candidate determination process) performed by the touching pattern candidate determination section 18 will be described.

Figure 10:
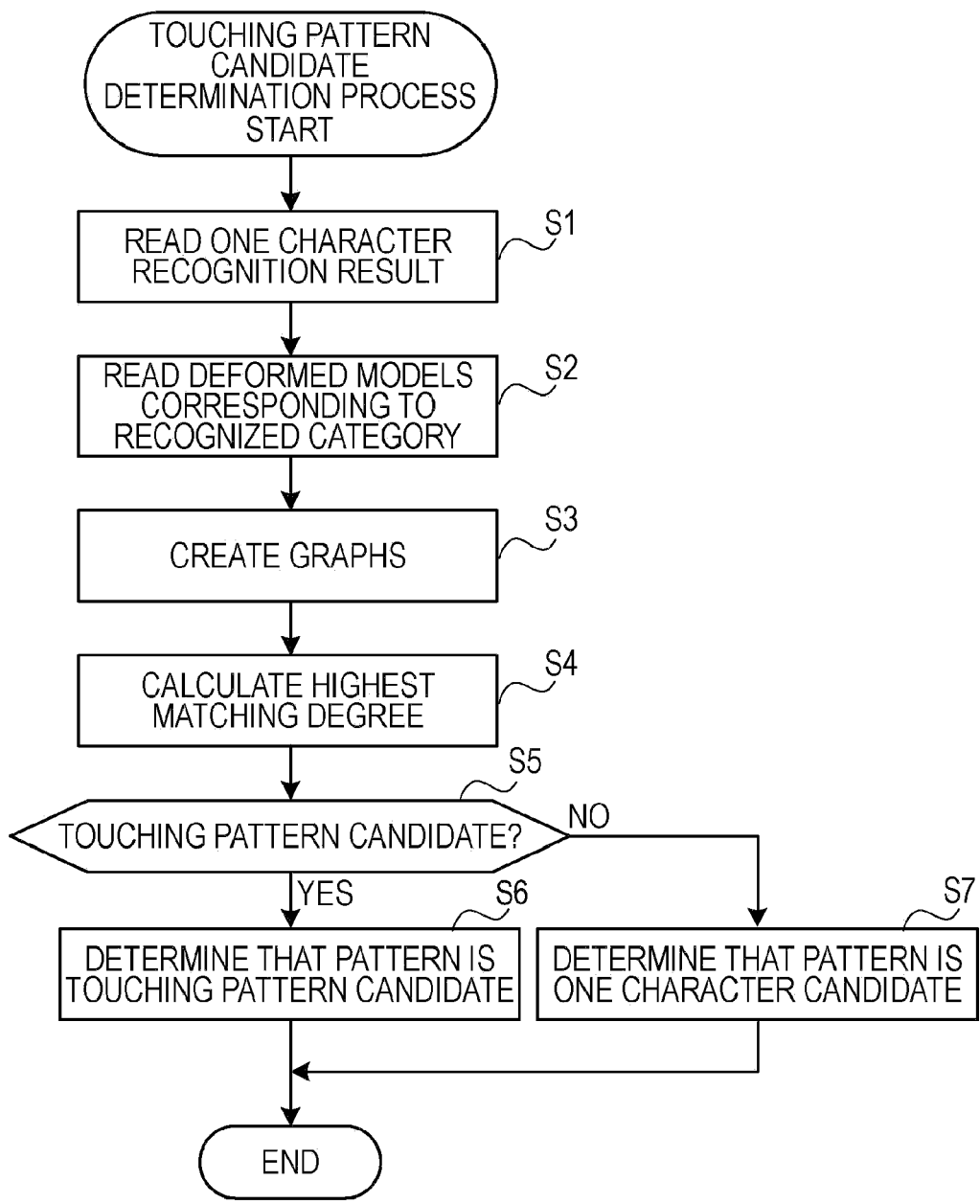
FIG. 10 is a flowchart showing a touching pattern candidate determination process.

FIG. 10 is a flowchart showing a touching pattern candidate determination process.

First, the deformed model graph reading section 181 receives the result of character recognition performed by the character recognition section 15 (step S1).

Next, the deformed model graph reading section 181 reads deformed model graphs corresponding to the first place character category in the character recognition result, from the deformed model graph storage section 17 (step S2).

Next, the size calculation section 182, character line width estimating section 183, line narrowing section 184, graphing section 185, and graph shaping section 186 perform processes thereof so that graphs, which are the results of shaping of the target pattern, are created (step S3).

Next, the model matching section 187 calculates the highest matching degree (step S4).

Next, on the basis of the calculated highest matching degree and width-to-height ratio, the determination section 188 determines whether the target pattern is a touching pattern candidate (step S5).

If the target pattern is a touching pattern candidate (YES in step S5), the determination section 188 determines that the target pattern is a touching pattern candidate (step S6).

In contrast, if the target pattern is not a touching pattern candidate (NO in step S5), the determination section 188 determines that the target pattern is a one-character candidate (step S6).

The touching pattern candidate determination process ends here.

Next, the process (model matching process) performed by the model matching section 187 in step S4 and the process (determination process) performed by the determination section 188 in step S5 will be described specifically.

<Model Matching Process>

By way of example, the matching technique using subgraph isomorphism determination described in Ullmann, "An Algorithm for Subgraph Isomorphism," Journal of the Association for Computing Machinery (1976), Vol. 23, No. 1, pp. 31 to 42 will be used. This technique is a technique for examining whether a subgraph of an input pattern graph is isomorphic to a deformed model graph.

There are various techniques for constructing a model graph. In this example, one deformed model graph has information: the number of the model; the number of edges of the model; the number of vertices of the model; a vertex connection matrix of the model; a vertex-edge adjacency matrix of the model; and the character category of the model. As this deformed model graph, for example, a graph including only an adjacency relation shown in the following structure struct Model_inf as information may be used.

```
struct Model_inf {
    short       model ID; model number
    short       edgeNo; the number of edges
    short       vertexNo; the number of vertices
    short       *smatrix; connection matrix pointer
    short       *bmatrix; adjacency matrix pointer
    short       category; character category of the model
};
```

The model matching section 187 performs matching using the vertex adjacency matrix of a graph created from the target pattern and the vertex adjacency matrix of a deformed model graph. Specifically, the model matching section 187 calculates isomorphic portions between the graph created from the target pattern and the deformed model graph. Then, the model matching section 187 obtains a correspondence matrix as the result of the matching.

In this case, one deformed model graph may be isomorphic to multiple subgraphs of the graph created from the target pattern. Accordingly, the matching result takes the form of a matrix where the model number of the deformed model graph, the number of matchings, and the vertices of the deformed model graph that match the graph created from the target pattern correspond to one another.

FIGS. 11A to 11D are drawings examples where matching is performed.

Hereafter, the graph created from the target pattern will be represented by "G," the number of deformed model graphs corresponding to the first place character category, C, in the character recognition result of the target pattern will be represented by "$N_C$," and the deformed model graph will be represented by $g^C_i$ (i=1, ..., $N_C$).

In FIG. 11, the graph G is compared with a deformed model graph corresponding to the first place character category C in the character recognition result of the target pattern.

Figure 11A:
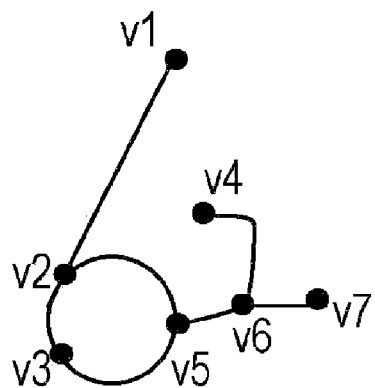
FIG. 11A is a drawing showing an G graph example.
Figure 11B:
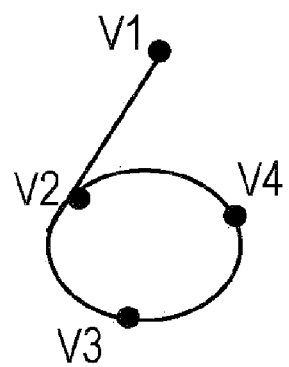
FIG. 11B is a drawing showing an example where matching is performed.

A vertex adjacency matrix Sp of the graph G shown in FIG. 11A and a vertex adjacency matrix Sm of a deformed model graph $g^6_1$ shown in FIG. 11B are represented by Formulas (1) and (2) below.

Formula 1

$$Sp = \begin{bmatrix} 0 & 1 & 0 & 0 & 0 & 0 & 0 \\ 1 & 0 & 1 & 0 & 1 & 0 & 0 \\ 0 & 1 & 0 & 0 & 1 & 0 & 0 \\ 0 & 0 & 0 & 0 & 0 & 1 & 0 \\ 0 & 1 & 1 & 0 & 0 & 1 & 0 \\ 0 & 0 & 0 & 1 & 1 & 0 & 1 \\ 0 & 0 & 0 & 0 & 0 & 1 & 0 \end{bmatrix} \quad (1)$$

Formula 2

$$Sm = \begin{bmatrix} 0 & 1 & 0 & 0 \\ 1 & 0 & 1 & 1 \\ 0 & 1 & 0 & 1 \\ 0 & 1 & 1 & 0 \end{bmatrix} \quad (2)$$

The size of the vertex adjacency matrix Sp is the number of vertices×the number of vertices of the graph G. The size of the vertex adjacency matrix Sm is the number of vertices×the number of vertices of the deformed model graph $g^6_1$. In each matrix, a vertex and a vertex have a value of "1" when the vertices are linked by an edge; otherwise, they have a value of "0." For example, a vertex v1 (first row) of the graph G shown in FIG. 11A is linked to only a vertex v2 by an edge. Accordingly, only the second column is "1" and the other columns are all "0." The vertex v2 (second row) is linked to the vertices v1, v3, and v5 by edges. Accordingly, the first, third, and fifth columns are "1" and the other columns are all "0."

For a correspondence matrix, the number of rows thereof corresponds to the number of vertices of the deformed model graph and the number of columns thereof corresponds to the number of vertices of the target graph. In the correspondence matrix, if a vertex and a vertex correspond to each other, the vertices are represented by "1"; otherwise, they are represented by "0."

Figure 11C:
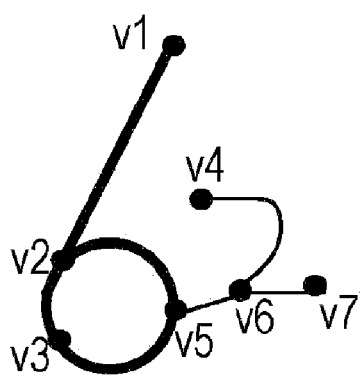
FIG. 11C is a drawings showing an example where matching is performed.
Figure 11D:
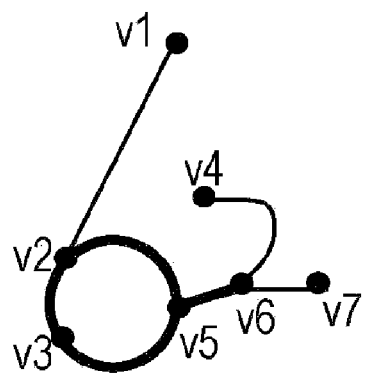
FIG. 11D is a drawings showing an another example where matching is performed.

When performing subgraph isomorphism determination between the graph G shown in FIG. 11A and the deformed model graph $g^6_1$ shown in FIG. 11B, a matching result shown in FIG. 11C is obtained. In FIG. 11C, the thick edges represent the portions matching the deformed model graph $g^6_1$.

FIG. 11C shows a matching result where a vertex V1 corresponds to the vertex v1, a vertex V2 corresponds to the vertex v2, a vertex V3 corresponds to the vertex v3, and a vertex V4 corresponds to the vertex v5.

Although not shown in FIG. 11C, a matching result where the vertex V1 corresponds to the vertex v1, the vertex V2 corresponds to the vertex v2, the vertex V3 corresponds to the vertex v5, and the vertex V4 corresponds to the vertex v3 can be also obtained.

Similarly, FIG. 11C shows a matching result where the vertex V1 corresponds to the vertex v6, the vertex V2 corresponds to the vertex v5, the vertex V3 corresponds to the vertex v2, and the vertex V4 corresponds to the vertex v3.

Although not shown in FIG. 11C, a matching result where the vertex V1 corresponds to the vertex v6, the vertex V2 corresponds to the vertex v5, the vertex V3 corresponds to the vertex v3, and the vertex V4 corresponds to the vertex v2 can be also obtained.

As seen, in the examples shown in FIG. 11C, the number of matchings is "4." The resulting correspondence matrixes M1 to M4 are represented by Formulas (3) to (6). The matrix M1 is a correspondence matrix indicating the matching result obtained by performing the first (k=1) subgraph isomorphism determination. The matrix M2 is a correspondence matrix indicating the matching result obtained by performing the second (k=2) subgraph isomorphism determination. The matrix M3 is a correspondence matrix indicating the matching result obtained by performing the third (k=3) subgraph isomorphism determination. The matrix M4 is a correspondence matrix indicating the matching result obtained by performing the fourth (k=4) subgraph isomorphism determination.

Formula 3

$$M1 = \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 0 & 1 & 0 & 0 \end{bmatrix} \quad (3)$$

Formula 4

$$M2 = \begin{bmatrix} 1 & 0 & 0 & 0 & 0 & 0 & 0 \\ 0 & 1 & 0 & 0 & 0 & 0 & 0 \\ 0 & 0 & 0 & 0 & 1 & 0 & 0 \\ 0 & 0 & 1 & 0 & 0 & 0 & 0 \end{bmatrix} \quad (4)$$

Formula 5

$$M3 = \begin{bmatrix} 0 & 0 & 0 & 0 & 0 & 1 & 0 \\ 0 & 0 & 0 & 0 & 1 & 0 & 0 \\ 0 & 0 & 1 & 0 & 0 & 0 & 0 \\ 0 & 1 & 0 & 0 & 0 & 0 & 0 \end{bmatrix} \quad (5)$$

Formula 6

$$M4 = \begin{bmatrix} 0 & 0 & 0 & 0 & 0 & 1 & 0 \\ 0 & 0 & 0 & 0 & 1 & 0 & 0 \\ 0 & 1 & 0 & 0 & 0 & 0 & 0 \\ 0 & 0 & 1 & 0 & 0 & 0 & 0 \end{bmatrix} \quad (6)$$

The matching results, that is, the number of the matched model, the number of matchings, and the correspondence matrixes corresponding to the number of matchings are stored in matching result storage structures, respectively. The matching result storage structures may be, for example, structures represented by the following struct Matched_result.

```
struct Matched_result {
    short    model ID;  model number
    short    No;        the number of matchings
    short    **mmatrix; No number of vertex correspondence matrixes
};
```

Next, on the basis of the obtained matching results, the model matching section 187 obtains the matching degrees between the graph G and each of the deformed model models corresponding to the first place character category in the character recognition result and obtains the highest of the matching degrees with each deformed model graph. Also, the model matching section 187 obtains a deformed model graph having the highest value from among the deformed model graphs and regards the highest value of the deformed model graph as the highest matching degree.

Figures 12, 13:
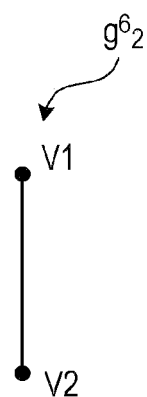
FIG. 12 is a drawing showing the highest matching degree.
FIG. 13 is a drawing showing the lengths of the edges of a graph.

FIG. 12 is a drawing showing the highest matching degree.

To describe the highest matching degree, another deformed model graph, $g^6_2$, of "6" is shown.

First, the process of obtaining the matching degrees with the models corresponding to the first place character category in the character recognition result will be described.

Assuming that the number of matchings between the graph G and the i-th deformed model graph, $g^C_i$, is ni, the matching degree obtained when the k-th subgraph isomorphism determination is performed between the graph G and the deformed model graph $g^C_i$ is defined as "$m_{Cik}$(k=1, . . . , $n_i$)."

If the number of edges or vertices of the graph G is smaller than the number of edges or vertices of the i-th deformed model graph $g^C_i$ corresponding to the character category C, the matching degree $m_{Cik}$ is "−1." If not so, the matching degree $m_{Cik}$ is the ratio of the sum of the lengths of the edges matched when the k-th subgraph isomorphism determination is performed between the graph G and the i-th deformed model graph $g^C_i$ corresponding to the character category C, to the sum of the lengths of all the edges of the graph G.

If the sum of the lengths of the edges matched when the k-th subgraph isomorphism determination is performed between the graph G and the deformed model graph $g^C_i$ is represented by "$I_{ik}$" and the sum of the lengths of all the edges of the graph G is represented by "L," Formulas (7) and (8) below are established.

$$m_{Cik} = I_{ik}/L \quad (7)$$

$$0 \leq m \leq 1, m_{Cik} = -1 \quad (8)$$

The lengths of the edges of the graph G are previously obtained. Also, the connection relations between the edges and vertices are previously obtained. For example, it is previously known that there is the edge e1 between the vertices V1 and V2. Thus, by substituting these values into the Formulas, the matching degree $m_{Cik}$ is obtained.

FIG. 13 is a drawing showing the lengths of the edges of the graph.

As shown in FIG. 13, the length corresponding to each edge label is stored.

FIGS. 14 and 15 are drawings showing the matching degrees of the deformed model graphs.

As described above, when using the subgraph isomorphism determination technique, the number of matchings between the deformed model graph $g^6_1$ and the subgraph of the graph G is "4." Accordingly, the sum of the lengths of the matched edges is calculated for each matching number (k).

For example, from the correspondence matrix M1, it is understood that the corresponding vertices are the vertices v1, v2, v3, and v5. Accordingly, the sum I11 of the lengths of the matched edges are the sum (=54) of the edge e1 between the vertices v1 and v2, the edge e2 between the vertices v2 and v3, the edge e3 between the vertices v3 and v5, and the edge e4 between the vertices v5 and v2.

The matching degree $m_{611}$ is $I_{1k}/L = 54/(22+10+12+10+7+13+7) = 0.67$.

Similarly, when using the subgraph isomorphism determination technique, the number of matchings between the deformed model graph $g^6_2$ and the subgraph of the graph G is "7." Accordingly, the sum of the lengths of the matched edges is calculated for each matching number (k).

The highest matching degree $m_{Cik}$ is defined as the matching degree MD (G, $g^C_i$) between the graph G and deformed model graph $g^C_i$. The matching degree (G, $g^C_i$) is obtained with respect to all deformed model graphs $g^C_i$(i=1, . . . , NC). The highest matching degree MD is defined as the highest matching degree MDC (G) between the graph G and the deformed model graphs corresponding to the character category C. These are represented by Formulas (9) to (11) below.

Formula 9

$$MD(G, g^C_i) = \max_k m_{Cik} \quad (9)$$

Formula 10

$$k = \underset{i}{\mathrm{argmax}}\, MD(G, g^C_i) \quad (10)$$

Formula 11

$$MD_C(G) = MD(G, g^C_k) \quad (11)$$

In an example shown in FIG. 14, the matching degree $MD(G, g^6_1) = \max\{0.67, 0.67, 0.48, 0.48\} = 0.67$.

In an example shown in FIG. 15, the matching degree $MD(G, g^6_2) = \max\{0.27, 0.12, 0.15, 0.12, 0.09, 0.16, 0.09\} = 0.27$.

Next, a model number giving the largest among the highest values is obtained. When the obtained matching degrees 0.67 and 0.27 are compared, 0.67 is larger and therefore the model number is "2."

That is, $\arg \max = \{MD(G, g^6_1), MD(G, g^6_2)\} = \arg \max\{0.27, 0.67\} = 2$.

Accordingly, the highest matching degree $MD_6(G)$ between the graph G and deformed model graphs $g^6_1$ and $g^6_2 = MD(G, g^6_2) = 0.67$.

<Determination Process>

The determination section 188 determines whether the target pattern is a touching pattern candidate on the basis of the highest matching degree $MD_C(G)$ between the graph G and the deformed model graphs corresponding to the character category C calculated by the model matching section 187 and the width-to-height ratio R of the target pattern calculated by the size calculation section 182.

The width-to-height ratio of the pattern is defined as the ratio W/H of the width W of the pattern to the height H thereof. In a case where the horizontal line orientation is used, if the pattern has a matching degree equal to or lower than a threshold MDth and higher than "0" with respect to the highest matching degree $MD_C(G)$ or has a width-to-height ratio R equal to or higher than a threshold Rth, the determination section 188 determines that the pattern is a touching pattern candidate.

That is, if the character category C of the recognition result is correct, the matching degree is high. In contrast, for a touching pattern, the matching degree thereof becomes lower. Accordingly, if the pattern has a matching degree equal to or less than the threshold MDth, it is determined that the pattern is a touching pattern candidate. However, if the size of the graph G is smaller than a deformed model graph having a matching degree of "0," it is determined that the pattern is not a touching pattern candidate.

Note that, for example, if the pattern has a large width-to-height ratio R (horizontally long) regardless of what is the matching degree when the horizontal line orientation is used, the pattern may be a touching pattern candidate. This is represented by Formula (12) below.

$$(MD_C(G) \leq MDth) \wedge (MD_C(G) > 0) \vee (R > Rth) \quad (12)$$

The determination section 188 determines that, for the pattern having a lower matching degree $MD_C(G)$, the reliability of the recognition result of the pattern decreases and that there is a high possibility that the pattern is a touching pattern candidate.

As described above, by matching a category obtained by performing one-character recognition with deformed models, the character recognition apparatus 10 structurally checks whether the category is correct. This makes it possible to determine whether a character is a touching pattern, without increasing the number of candidates.

Also, the deformed model graph creation section 16 automatically creates initial deformed model graphs using graph isomorphism determination or the like and then the monitor 104a displays the initial deformed model graph on the monitor 104a, urging the user to accept or reject the initial deformed model graphs. This makes it possible to eliminate improper deformed model graphs, thus increasing the accuracy of a determination as to whether the pattern is a touching pattern candidate.

Also, the processes performed by the character recognition apparatus 10 may be performed by multiple apparatuses in a distributed manner. For example, one apparatus may create deformed model graphs and another apparatus may determine whether the pattern is a touching pattern, using the model graphs.

While the character recognition program, character recognition method, and character recognition apparatus have been heretofore described on the basis of the illustrated embodiments, the various embodiments not limited to the illustrated embodiments. The elements thereof may be replaced with any elements having similar functions. Also, any other elements or steps may be added to the various embodiments.

Also, the various embodiments may be combinations of any two or more configurations (features) of the above-mentioned embodiments.

Also, the above-mentioned processing functions may be realized by a computer. In that case, a program where the contents of the processes performed by the functions of the character recognition apparatus 10 are described is provided. By executing the program using a computer, the above-mentioned processing functions are realized by the computer. The program where the processes are described may be stored in a computer-readable storage medium. Examples of a computer-readable storage medium include magnetic storage units, optical disks, magneto-optical storage media, and semiconductor memories. Examples of magnetic storage units include hard disk drives (HDDs), flexible disks (FDs), and magnetic tapes. Examples of optical disks are DVDs (digital versatile discs), DVD-RAMs (DVD-random access memories), CD-ROMs (compact disc read only memories), and CD-Rs (CD-recordable)/CD-RWs (CD-rewritable). Examples of magneto-optical storage media include MOs (magneto-optical disks).

To distribute the above-mentioned program, for example, transportable storage media where the program is stored, such as DVDs or CD-ROMs, are sold. Also, the above-mentioned program may be previously stored in a storage unit of a server computer and may be transferred from the server computer to another computer via a network.

The another computer, that is, the computer for executing the character recognition program stores the program recorded in a transportable storage medium or transferred from the server computer, for example, in a storage unit thereof. Then, the computer reads the program from the storage unit and executes the processes in accordance with the program. Alternatively, the computer may directly read the program from the transportable storage medium and execute the processes in accordance with the program. Alternatively, each time the computer receives the program from the server computer, it may execute the processes in accordance with the program.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the various embodiments. Although various embodiments have been described in detail, it should be understood that the various changes, substitutions, and alterations could be made hereto without departing from the spirit and scope of the various embodiments.

The invention claimed is:

1. A non-transitory storage medium storing a character recognition program for causing a computer to execute a process, the process comprising:
comparing a structure of a target pattern regarded as one character with a structure of a one-character pattern stored in a storage section; and
determining whether the target pattern is a pattern including a plurality of characters based on the comparing.

2. The non-transitory storage medium storing a character recognition program according to claim 1, wherein
the comparing compares the structure of the target pattern with the structures of a plurality of one-character patterns stored in a storage section by calculating a percentage of each one-character pattern matching the structure of the target pattern as a similarity degree, and
the determining determines that the target pattern is a pattern including a plurality of characters when the similarity degree is equal to or lower than a threshold.

3. The non-transitory storage medium storing a character recognition program according to claim 2, wherein
the comparing calculates the similarity degree by associating an adjacency relation between vertices of a graph created from each one-character pattern with an adjacency relation between vertices of a graph created from the target pattern.

4. The non-transitory storage medium storing a character recognition program according to claim 2, wherein
the comparing calculates a ratio of a sum of lengths of inter-vertex edges of a graph created from each one-character pattern matching inter-vertex edges of a graph created from the target pattern, to a sum of lengths of all inter-vertex edges of the graph created from the target pattern as the similarity degree.

5. The non-transitory storage medium storing a character recognition program according to claim 1, the process further comprising
obtaining a width-to-height ratio of the target pattern, wherein
the determining determines whether the target pattern is touching other characters based on the width-to-height ratio and a result of the comparing.

6. A character recognition method, comprising:
comparing, by a processor, a structure of a target pattern regarded as one character with structures of a plurality of one-character patterns stored in a storage section; and
determining whether the target pattern is a pattern including a plurality of characters based on the comparing.

7. The character recognition method according to claim 6, wherein
the comparing compares the structure of the target pattern with the structures of a plurality of one-character patterns stored in a storage section by calculating a percentage of each one-character pattern matching the structure of the target pattern as a similarity degree, and
the determining determines that the target pattern is a pattern including a plurality of characters when the similarity degree is equal to or lower than a threshold.

8. The character recognition method according to claim 7, wherein
the comparing calculates the similarity degree by associating an adjacency relation between vertices of a graph created from each one-character pattern with an adjacency relation between vertices of a graph created from the target pattern.

9. The character recognition method according to claim 7, wherein
the comparing calculates a ratio of a sum of lengths of inter-vertex edges of a graph created from each one-character pattern matching inter-vertex edges of a graph created from the target pattern, to a sum of lengths of all inter-vertex edges of the graph created from the target pattern as the similarity degree.

10. The character recognition method according to claim 6, further comprising
obtaining a width-to-height ratio of the target pattern, wherein
the determining determines whether the target pattern is touching other characters based on the width-to-height ratio and a result of the comparing.

11. A character recognition apparatus, comprising:
a memory; and
a processor, by executing a procedure in the memory, configured to:
compare a structure of a target pattern regarded as one character with structures of a plurality of one-character patterns stored in a storage section; and
determine whether the target pattern is a pattern including a plurality of characters based on a result of the comparison.

12. The character recognition apparatus according to claim 11, wherein the processor, by executing the procedure in the memory, is further configured to:
compare the structure of the target pattern with the structures of a plurality of one-character patterns stored in a storage section by calculating a percentage of each one-character pattern matching the structure of the target pattern as a similarity degree, and
determine that the target pattern is a pattern including a plurality of characters when the similarity degree is equal to or lower than a threshold.

13. The character recognition apparatus according to claim 12, wherein the processor, by executing the procedure in the memory, is further configured to:
calculate the similarity degree by associating an adjacency relation between vertices of a graph created from each one-character pattern with an adjacency relation between vertices of a graph created from the target pattern.

14. The character recognition apparatus according to claim 12, wherein the processor, by executing the procedure in the memory, is further configured to:
calculate a ratio of a sum of lengths of inter-vertex edges of a graph created from each one-character pattern matching inter-vertex edges of a graph created from the target pattern, to a sum of lengths of all inter-vertex edges of the graph created from the target pattern as the similarity degree.

15. The character recognition apparatus according to claim 11, wherein the processor, by executing the procedure in the memory, is further configured to:
obtain a width-to-height ratio of the target pattern, and
determine whether the target pattern is touching other characters based on the width-to-height ratio and a result of the comparison.

* * * * *